Dec. 15, 1931.   L. C. MAMBOURG   1,836,378
SHEET GLASS APPARATUS
Filed June 13, 1927   2 Sheets-Sheet 1
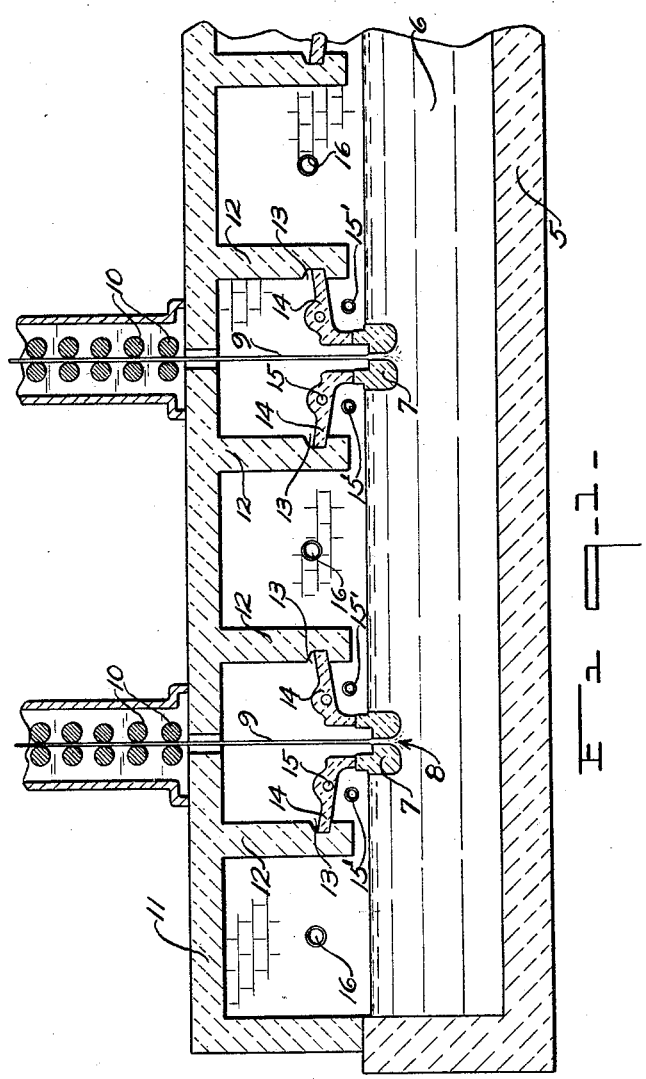
Inventor
Luke C. Mambourg
By Frank Fraser
Attorney Dec. 15, 1931.   L. C. MAMBOURG   1,836,378
SHEET GLASS APPARATUS
Filed June 13, 1927   2 Sheets-Sheet 2
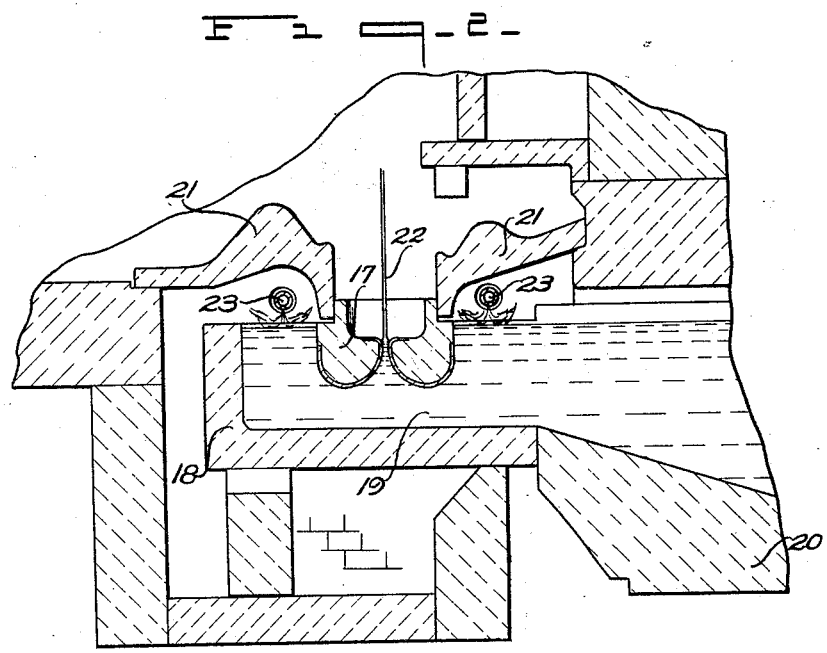
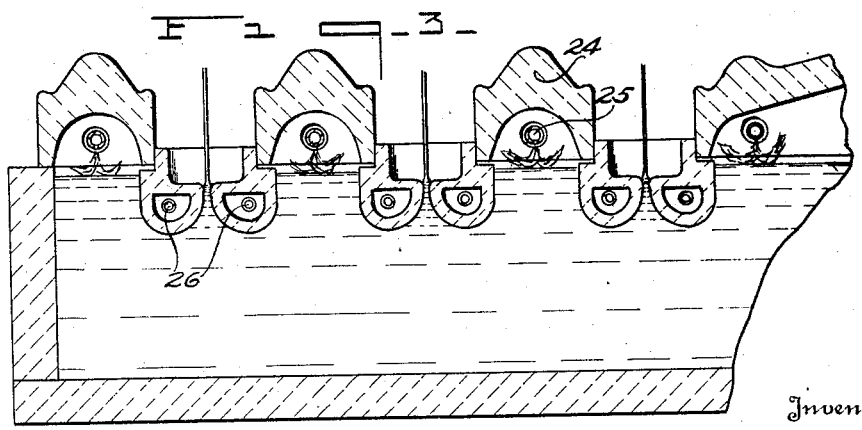
Inventor
Luke C. Mambourg
By Frank Fraser,
Attorney Patented Dec. 15, 1931

1,836,378

UNITED STATES PATENT OFFICE

LUKE C. MAMBOURG, OF LANCASTER, OHIO, ASSIGNOR TO LIBBEY-OWENS-FORD GLASS COMPANY, OF TOLEDO, OHIO, A CORPORATION OF OHIO

SHEET GLASS APPARATUS

Application filed June 13, 1927. Serial No. 198,396.

The present invention relates to sheet glass apparatus.

An important object of the invention is to provide in a glass apparatus wherein a sheet is formed by means of a deputer arranged in a manner for molten glass, means adapted to reduce to a minimum the formation of devitrified glass around said deputer.

Another object is to provide in such glass apparatus wherein a deputer is used to form the sheet of glass, means associated with the deputer to permit heating of the glass around the deputer without interfering with the formation of the sheet.

Other objects and advantages of the invention will become more apparent during the course of the following description.

In the drawings wherein like numerals are employed to designate like parts throughout the same, Fig. 1 is a vertical longitudinal section through a portion of my improved apparatus, Fig. 2 is a fragmentary vertical longitudinal section through a modified form of construction, and Fig. 3 is a similar view of still another form of construction.

The present invention relates particularly to that type of apparatus using a deputer or a plurality of deputers to form a sheet or sheets of glass. A deputer in the glass art refers to a slotted block or slab adapted to be arranged in a mass of molten glass in a manner that a sheet may be formed under hydrostatic pressure due to the fact that the exit or top of the slot in the slab is adapted, when in operative position, to be arranged below the level of the molten mass in which the deputer is disposed.

As far as is known, the deputers in the commercial machines used heretofore have been formed from a refractory clay. Due to the refractory clay and other conditions, the glass surrounding the deputer or deputers very shortly becomes solidified. When this condition exists, it is necessary for molten glass to pass down beneath the solidified glass and then through the slot in the deputer. Of course, this solidified or devitrified glass is objectionable and detrimental to the formation of a high quality sheet of glass. As the formation of this devitrified glass is comparatively rapid, it is necessary to shut down the machine frequently to remove such glass.

The present invention has been designed to eliminate as far as possible the formation of devitrified glass called in the art "dog-metal". The dog-metal has a tendency to break off and when it enters the sheet causes considerable trouble.

Referring to the drawings, the numeral 5 designates a receptacle adapted to contain a mass of molten glass 6. In the construction shown in Fig. 1, a plurality of deputers 7, each having a slot 8, are adapted to be arranged in the mass of molten glass in a manner that a sheet 9 may be formed with each deputer. It will be seen that the top of the slot 8 is arranged below the surface of the molten mass 6 so that the sheet will be formed under hydrostatic pressure. Any form of drawing or conveying means may be used to draw the sheet 9, and I have illustrated, diagrammatically, rolls 10. Arranged over the receptacle 5 is a hood or cap 11 which may be provided with a plurality of depending aprons or curtain walls 12, each curtain wall being arranged preferably on each side of the deputer 7. Each of the curtain walls is provided with a suitable slot 13 adapted to support one end of a lip tile 14. As shown, two lip tiles are associated with each deputer, one end of the lip tile being associated directly with the deputer, and as shown in Fig. 1 is actually supported thereby. A suitable support in the form of a pipe or the like may be arranged through the opening 15 in said lip tile. If it is desired, the lip tiles may be used to hold the deputers in a depressed position or the deputers may be supported by other any event, the lip tiles will effectively protect the sheets 9 from the heat and gases present around the receptacle.

To prevent excessive cooling of the molten glass burners 15' or other heating means are arranged on each side of the deputers, while additional burners 16 may be arranged between the deputers as shown.

In the construction shown in Fig. 1, the molten glass flows into the receptacle 6 from any suitable source. Some of the glass is used by the first deputer, while the remaining glass passes on to the next deputer and so on. It may be preferable to have each deputer separate, in a chamber by itself, in which case the glass does not have to pass under one deputer in order to reach the others. By using heating means, the glass as it reaches the last deputer will not be unduly chilled. In fact, any desired temperature can be created around each deputer.

In Fig. 2, a single deputer 17 is used in conjunction with a draw pot 18, the depth of the pot 18 being such that the deputer can be arranged in operative position and still leave a substantial distance between the bottom of the deputer and the bottom of the pot. The molten glass 19 may be continuously supplied to the draw pot and deputer from a tank furnace 20. Lip tiles 21 are associated with the deputer in a manner to protect the sheet 22. Heating means 23 are provided to assist in maintaining the molten glass at the proper temperature suitable for being formed into a commercial sheet.

In Fig. 3 the deputers are so arranged that a single lip tile 24 may be associated with two adjacent deputers. Of course, in all instances, heating means 25 are preferably used between the deputers to prevent chilling of the glass.

By using the lip tiles and heating means above described, the molten glass will not become solidified as is common in the types of machines now used. Consequently, the necessity for frequent shut downs is eliminated, while the condition of the glass will also be improved.

The deputers may be formed from refractory clay or from any non-corrosive metal or the like. The deputers may also be internally heated as by the means 26 arranged therewithin. It will be seen that an apparatus has been disclosed whereby a deputer or a plurality of deputers may be placed in an operative position within a mass of molten glass to produce a sheet or a plurality of sheets of glass. Further, by using heating means as shown, the glass may be properly conditioned so that glass of the right consistency will be furnished to each deputer.

It is to be understood that the form of the invention herewith shown and described is to be taken as the preferred embodiment of means and used to support the lip tiles. In the same, and that various changes in the shape, size and arangement of parts may be resorted to without departing from the spirit of the invention or the scope of the subjoined claims.

Claims:

1. In sheet glass apparatus, a receptacle containing a mass of molten glass, a deputer arranged therein, and substantially horizontal lip tiles positioned above the receptacle and covering the molten glass therein at opposite sides of the deputer, the inner adjacent ends of the lip tiles engaging said deputer.

2. In sheet glass apparatus, a receptacle containing a mass of molten glass, a deputer arranged therein, substantially horizontal lip tiles positioned above the receptacle and covering the molten glass therein at opposite sides of the deputer, the inner adjacent ends of the lip tiles engaging said deputer, and means for heating the glass around the deputer.

4. In sheet glass apparatus, a receptacle containing a mass of molten glass, a deputer arranged within the molten glass and projecting thereabove, substantially horizontal lip tiles positioned above the receptacle and covering the molten glass therein at opposite sides of the deputer, the inner adjacent ends of the lip tiles engaging said deputer and being spaced above the mass of molten glass, and heating means positioned beneath the lip tiles at opposite sides of said deputer.

4. In sheet glass apparatus, a receptacle containing a mass of molten glass and provided with a cap, a deputer arranged within the mass of molten glass, depending curtain walls carried by said cap and located at opposite sides of the deputer, lip tiles extending between the curtain walls and deputer and adapted to engage the latter, said cap, curtain walls and lip tiles cooperating to form a substantially closed drawing chamber, and heating means located beneath the lip tiles at opposite sides of said deputer.

5. In sheet glass apparatus, a receptacle containing a mass of molten glass and provided with a cap, a deputer arranged within the mass of molten glass, vertical curtain walls depending from said cap and located at opposite sides of the deputer, substantially horizontal lip tiles extending between the curtain walls and deputer with the inner adjacent ends of the lip tiles resting upon the latter, said cap, curtain walls, and lip tiles cooperating to form a substantially closed drawing chamber.

6. In sheet glass apparatus, a receptacle containing a mass of molten glass and provided with a cap, a deputer arranged within the mass of molten glass, vertical curtain walls depending from said cap and located at opposite sides of the deputer, substantially horizontal lip tiles extending between the curtain walls and deputer with the inner adjacent ends of the lip tiles resting upon the latter, said cap, curtain walls, and lip tiles cooperating to form a substantially closed drawing chamber, and heating means located beneath the lip tiles at opposite sides of said deputer.

Signed at Lancaster, in the county of Fairfield and State of Ohio, this 9th day of June, 1927.

LUKE C. MAMBOURG.